Nov. 29, 1955   K. WEINHOLD   2,725,246
SELF-ADJUSTING QUICK COUPLING DEVICE FOR HOSE
Filed March 18, 1952
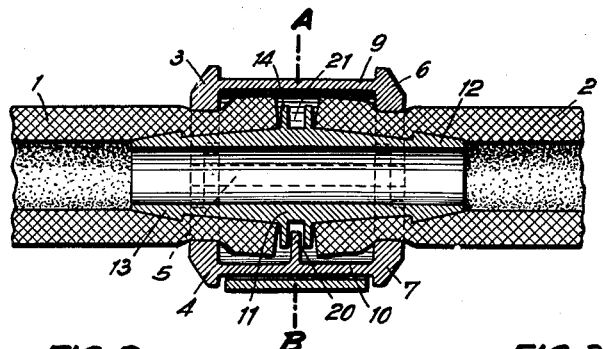
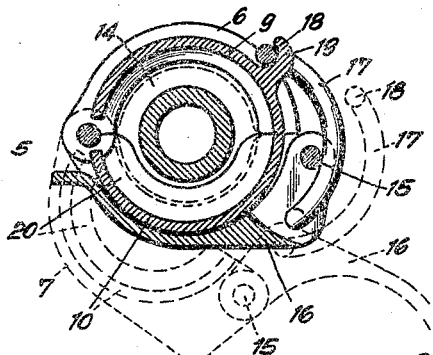
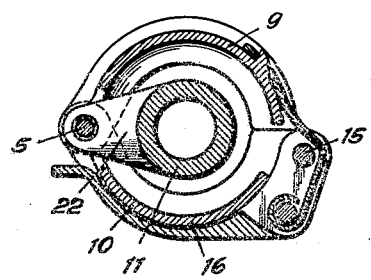
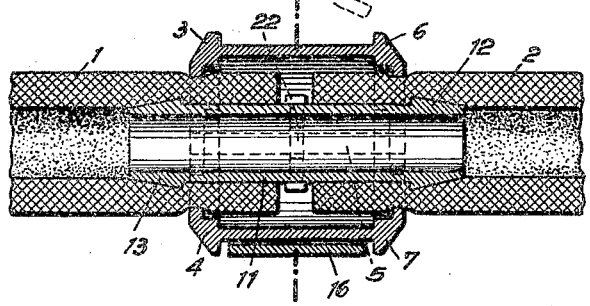
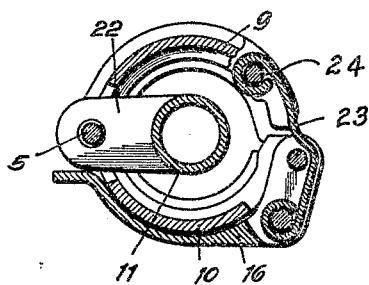
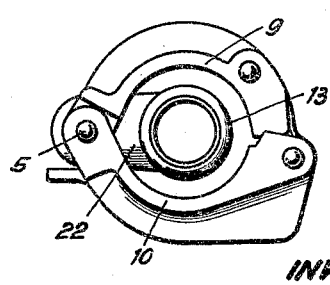
INVENTOR
KARL WEINHOLD
by  *Toulmin & Toulmin*
ATTORNEYS

United States Patent Office 2,725,246
Patented Nov. 29, 1955

2,725,246

SELF-ADJUSTING QUICK COUPLING DEVICE FOR HOSE

Karl Weinhold, Dusseldorf, Germany

Application March 18, 1952, Serial No. 277,225

Claims priority, application Germany March 28, 1951

5 Claims. (Cl. 285—77)

This invention relates to couplings, particularly quick detachable couplings especially for conduits or hose of resilient material.

Quick detachable couplings of the nature referred to are known in the art, but heretofore have been lacking in one or more respects, for example, some of the couplings are of a nature that the seal effected either tended to leak, or easily became leaky after the coupling was in use for a short time. In other circumstances, the seal effected was adequate, but the coupling could not be detached quickly and easily enough to be used in all circumstances.

Couplings of the nature referred to according to the prior art, as, for example, couplings for compressed air lines, generally comprise two similar coupling halves which are connected to the end of the two lengths of hose to be connected, and then the couplings brought together and drawn together and a seal effected therebetween by means of packing located in the face of each coupling half. The principal disadvantage of a coupling of this nature is that the packing rings in the faces of the coupling halves tend to deteriorate rapidly, and within a short time a substantial amount of air is lost therefrom.

In another type of coupling, the coupling is made in the form of a union with a ground joint, with the coupling halves clamped to the hose ends and retained thereon by screw threads. With an arrangement of this nature, there is always the chance of the threads becoming damaged and making the coupling inoperative, and, furthermore, great precision is required in the production of the ground joints where the seal between the coupling halves is effected, and even the slightest bit of foreign matter between the ground faces of the joints will cause leakage. Such a coupling also must many times be drawn up tight with a wrench, and this materially detracts from the speed with which the coupling can be opened and closed.

With the foregoing in mind, the present invention has for its particular object the provision of a coupling of the quick detachable type, particularly for resilient hose and the like, which avoids all of the objections referred to above that occur in connection with prior art couplings.

This invention also has as an object the provision of a coupling of the nature referred to which will be inexpensive to manufacture.

A still further object is the provision of a quick detachable coupling which will automatically compensate for irregularities in the thickness of the wall of the hoses being connected.

In brief, the objects of this invention are obtained by providing an inner sleeve adapted for being received in the ends of the lengths of hose to be connected and a double clamp adapted for clamping about the ends of the hoses which are slipped over the sleeve. The clamp is advantageously provided with a manually operated overcenter spring clip or clamp by means of which it can be very quickly closed or opened.

These and other objects and advantages will become more apparent upon reference to the following description, taken in connection with the accompanying drawings, in which:

Figure 1 shows a longitudinal section through a coupling according to my invention;

Figure 2 is a cross-section, indicated by line a—b in Figure 1;

Figure 3 is a cross-section similar to Figure 2, but showing a somewhat different constructional arrangement of the coupling;

Figure 4 is a view like Figure 1, but shows a somewhat different arrangement of the coupling;

Figure 5 is a sectional view similar to Figure 2 and is indicated by line c—d in Figure 4; and Figure 6 is an end elevational view of the coupling of Figures 4 and 5.

Referring to the drawings somewhat more in detail, in Figure 1 there is illustrated the hose ends 1 and 2, and clamped about the hose ends is a plier-like clamp consisting of the arms 3 and 4 about hose end 1, and arms 6 and 7 about hose end 2. These arms are integrally connected, as by the sleeve portion 9, extending between jaws 3 and 6 and sleeve portion 10 extending between jaw portions 4 and 7, and the plier-like arrangement is obtained by the pivot bolt 5, as will best be seen in Figure 2.

Within the described clamp and extending into both of the hose ends is a sleeve 11 having the enlarged portion 12, 13 at the opposite ends thereof and the spaced central annular collars 14.

When the coupling is to be employed for connecting the hose ends together, the hose ends are positioned into the hose ends of the double sleeve 11 until they abut one of the collars 14, and the jaws are then clamped around the hose ends, as illustrated in Figure 1.

The clamping of the jaws about the hose ends may be accomplished by providing a finger lever 16 pivoted to one of the jaws, for example, the jaws 4 and 7, by means of a pivot pin 15 which may, for example, be carried by the sleeve 10 that connects the said jaws. Lever 16 has a loop or yoke 17 pivoted thereon by pin 17' in eccentric relation to pivot pin 15. The closed end 18 of loop 17 is adapted for hooking over hook 19 associated with jaws 3 and 6 by being secured, for example, to the interconnecting sleeve 9 of the said jaws.

It will be noted in Figure 2 that when the coupling is closed, the pivot point of loop 17 on finger lever 16 has snapped overcenter relative to pivot pin 15 and the coupling is thus positively locked closed.

A further feature of the coupling illustrated in Figures 1 and 2 resides in the rib 20 which may be formed on one of the sleeves 9 and 10, and which extends into the annular groove 21 between collars 14. This arrangement permits of radial shifting of sleeve 11 relative to the encircling clamp to accommodate for variable thicknesses in the walls of the hose ends, while at the same time providing for axial location of the clamp relative to the sleeve so that when the clamp is closed, the jaws 3, 4, 6, and 7 thereof are positioned inwardly of the enlarged portions 12 and 13 of the sleeve 11. The arrangement thus provides a positive connection between the hose ends and one which is leak-tight under all circumstances.

The arrangement shown in Figure 3 is similar to the arrangement of Figures 1 and 2, but the sleeve 11, instead of being provided with collars 14 is provided with a finger or arm 22 that extends laterally outwardly and encircles pivot pin 5 for the jaws. Arm or finger 22 preferably encircles the pivot pin loosely to permit a predetermined amount of radial movement of sleeve 11 within the clamp. The provision of finger or arm 22 makes the clamp a unitary assembly, so that when the clamp is opened, there is no possibility of any part thereof becoming lost. Further, the finger or arm prevents the sleeve 11 from turning when the clamp is open, and this facilitates the removing of the hose ends when it is desired to disconnect the coupling.

In Figure 3 the clamping member 17 consists of a flat resilient strip, and this provides for a high degree of resilience in the clamp, so that it remains bearing tightly against the surface of the hose ends at all times.

It is to be noted that the width of the jaws in actual clamping engagement with the hose ends is relatively narrow, on the order, say, of two to three millimeters, and that this produces a relatively high compressive stress in the hose to insure that the coupling will be fluid-tight, while, at the same time, the stress on the hose is distributed over a sufficiently great area that the hose is not cut or crushed.

The arrangement shown in Figures 4, 5, and 6, is similar to the modifications of Figures 1, 2, and 3, with the essential difference consisting in the construction of the resilient clamping strip 23, and which, instead of being detachably engaged with a hook or projection on the upper clamp half such as 19 in Figure 2, is pivoted thereto, as by a pivot pin 24. The Figures 4, 5, and 6 arrangement thus further carry out the idea of the coupling being made in an integral unit.

It will be appreciated that the coupling device of this invention can be used not only for conventional rubber hoses, but also for hose made of plastic, particularly elastomeric plastic, and that it can be employed not only in connection with air hoses, but also with hydraulic hoses, water lines, and in chemical plants.

It will also be understood that the illustrated and described conventional arrangements are merely by way of example of the preferred manner of adapting this invention to a specific conventional embodiment, and that many changes can be made in the actual construction of the device without departing from this invention.

For example, the double clamp could be shaped in a different manner and provided with a different sort of closing device, and which closing device could be locked a number of different ways. The radial shiftability of the internal double sleeve relative to the outer clamp could also be accomplished through suitably arranged guides and bearing surfaces, and also by means of a connection between the sleeve and the outer clamp, if so desired.

It will also be evident that while I have illustrated an arrangement consisting of a double sleeve and a double clamp, it is also conceivable that the two ends of the coupling might be made differently, one, for example, with a screw thread, and the other with the clamp and sleeve arrangement according to this invention, and that, furthermore, under certain circumstances, the opposite ends of the outer clamp could be separately formed and have separate closing and locking devices with a common pivot pin articulating the two clamping devices so that in circumstances where it was always a certain one of the hoses that was disconected, it would not be necessary every time to disconnect the other hose as well.

It will be understood that this invention is susceptible to modification in order to adapt it to different usages and conditions, and, accordingly, it is desired to comprehend such modifications within this invention as may fall within the scope of the appended claims.

I claim:

1. A quick coupling device for resilient hoses and the like having a clamp consisting of a first and second jaw part pivotally connected with each other at one end by means of a connecting pin; and an inner sleeve having conically tapered annular enlargements at its opposite ends for passing thereover the ends of the hoses to be connected so as to grip them tightly between said inner sleeve and said jaw parts of said clamp in closed position; said device comprising a link member rigidly attached in central position on and projecting radially from said inner sleeve, said link member being mounted with its free end with play on said connecting pin, so as to allow a limited radial and axial displacement of said inner sleeve in relation to said clamp; a finger lever pivotally mounted at its one end on a lever pin mounted at the end of said first jaw part opposite said connecting pin; and a leaf spring for connecting said lever with said second jaw part, said spring being mounted at its one end on a first spring holding pin mounted on said lever in spaced relation to said lever pin, and the other end of said spring being mounted on a second spring holding pin mounted on said second jaw part in spaced relation to said connecting pin; said leaf spring being conducted outwardly around said lever pin and holding said clamp in closed position when said lever is in contact with the whole length of said first jaw part; and opening said clamp when said lever is moved out of contact with said first jaw part.

2. A quick coupling device for resilient hoses and the like having a clamp consisting of a first and second jaw part pivotally connected with each other at one end by means of a connecting pin, and an inner sleeve having conically tapered annular enlargements at its opposite ends for passing thereover the ends of the hoses to be connected so as to grip them tightly between said inner sleeve and said jaw parts of said clamp in closed position; an arm connected with said sleeve and projecting laterally therefrom; said connecting pin passing loosely through the laterally projecting end of said arm, said first and second arcuate jaw parts having flanged portions at their opposite sides forming annular hose engaging areas for engaging said hose ends at a slight distance from the said annular enlargements on the ends of said inner sleeve; a finger lever pivotally supported at its one end between the flanged portions of said first jaw part on a lever pin mounted at the end opposite said connecting pin, a spring engaging pin mounted on said finger lever in spaced relation to said lever pin; a leaf spring attached at one end to said spring engaging pin on said finger lever, and at the other end to a pin mounted on the second jaw part near the end thereof opposite said connecting pin, said spring being conducted outwardly around said pivot pin bearing said arcuate jaw parts and forming the fulcrum for said lever, said spring being of such length that said jaw parts are held in closed position and pressed against the hose when said lever is in contact with said first jaw part, while said spring is relieved when said lever is moved out of contact with said first jaw part, thereby opening said clamp and releasing said hose ends.

3. A quick coupling device for resilient hoses and the like comprising an inner sleeve having annular enlargements at its opposite ends, said enlargements being conically tapered toward said ends and being adapted for receiving thereon the ends of the hoses to be connected; an arm connected with said sleeve and projecting radially therefrom; a connecting pin housed loosely in the laterally projecting end of said arm and projecting in axial direction on both sides thereof; a clamp adapted for mounting about said hose ends, said clamp consisting of a first and a second arcuate jaw part, said jaw parts being pivotally arranged on said pivot pin, and having flanged portions at their opposite sides, said jaw parts comprising annular hose engaging areas for engaging said hose ends at a slight distance from the said annular enlargements on the ends of said inner sleeve, said hose ends thus being gripped firmly between said hose engaging areas of said jaw parts and said enlargements of said inner sleeve when said clamp is closed; a finger lever pivotally supported at its one end on a lever pin mounted between the flanged portions of said first jaw part at its end opposite said connecting pin, said lever having a recess near its supported end with a spring holding pin rigidly mounted therein; a leaf spring rotatably mounted with its one end on said pin in said lever recess, and with its other end on a pin mounted on the second jaw part away from said connecting pin, said spring being conducted outwardly around said lever pin and holding said jaw parts in closed position when said lever is in contact with said first jaw part, while said spring is relieved when said lever is moved out of contact with said first jaw part, thereby opening said clamp and releasing said hose ends.

4. A quick coupling device for resilient hoses and the like comprising an inner sleeve having annular enlargements at its opposite ends, said enlargements being conically tapered toward said ends and being adapted for receiving thereon the ends of the hoses to be connected; an arm connected with said sleeve and projecting radially therefrom; a connecting pin housed loosely in the laterally projecting end of said arm and projecting in axial direction on both sides thereof; a clamp adapted for mounting about said hose ends, said clamp consisting of a first and a second arcuate jaw part, said jaw parts being pivotally arranged on said pivot pin, and having flanged portions at their opposite sides, said jaw parts comprising annular hose engaging areas for engaging said hose ends at a slight distance from the said annular enlargements on the ends of said inner sleeve, said hose ends thus being gripped firmly between said hose engaging areas of said jaw parts and said enlargements of said inner sleeve when said clamp is closed; a finger lever pivotally supported at its one end on a lever pin mounted between the flanged portions of said first jaw part at its end opposite said connecting pin, said lever having a recess near its supported end with a spring holding pin rigidly mounted therein; a leaf spring rotatably mounted with its one end on said pin in said lever recess, and with its other end on a pin mounted on the second jaw part away from said connecting pin, spring being conducted outwardly around said lever pin and preventing said clamp from opening; and said spring being relieved when said lever is moved out of contact with said first jaw part, thereby opening said clamp and releasing said hose ends.

5. In a quick coupling device for resilient hoses and the like having a clamp consisting of a first and second jaw part pivotally connected with each other at one end by means of a connecting pin; and an inner sleeve having conically tapered annular enlargements at its opposite ends for passing thereover the ends of the hoses to be connected so as to grip them tightly between said inner sleeve and said jaw parts of said clamp in closed position, a combination comprising said jaw parts having annular hose engaging areas spaced slightly less than the distance between the said annular enlargements on the ends of said inner sleeve, central transversal recesses in said jaw parts at the said end of the connecting pin, said recesses registering with each other to form a transverse arcuate slot, link means rigidly connected with and projecting radially from said sleeve between the said hose ends and extending through said arcuate slot to be rotatably and loosely mounted on said connecting pin for connecting said sleeve with said jaws, said link means being capable of a limited axial and radial displacement within said slot thereby holding said sleeve in essentially central position with regard to said clamp, so that the said hose-engaging areas of said jaw parts press upon the said hose ends immediately inwardly of the said enlargements on said sleeve, while permitting a limited axial and radial displacement of said sleeve in relation to said clamp thereby causing even pressure to be applied to said hose ends on all sides around their peripheries independent of eccentric irregularities in the wall thickness of said hoses; and a manually operable resilient connector connecting the said jaw parts at their sides opposite said pivot operable to draw the jaw parts toward each other and into resilient engagement with the hose ends on said inner sleeve.

References Cited in the file of this patent

UNITED STATES PATENTS

| | | |
|---|---|---|
| 142,388 | Goble | Sept. 2, 1873 |
| 509,458 | Still | Nov. 28, 1893 |
| 548,932 | Snyder | Oct. 29, 1895 |
| 740,664 | Kroll | Oct. 6, 1903 |
| 936,627 | Hill | Oct. 12, 1909 |
| 1,122,557 | Versluis | Dec. 29, 1914 |
| 1,303,098 | Merz | May 6, 1919 |
| 1,358,633 | Hachmann | Nov. 9, 1920 |
| 2,303,927 | Fogg | Dec. 1, 1942 |
| 2,304,911 | Harpold | Dec. 15, 1942 |
| 2,479,580 | Marco | Aug. 23, 1949 |

FOREIGN PATENTS

| | | |
|---|---|---|
| 51,603 | Austria | July 15, 1911 |